(Model.)
N. A. L. J. JOHANNSEN.
DUPLEX SPRING BALANCE.
No. 269,941. Patented Jan. 2, 1883.
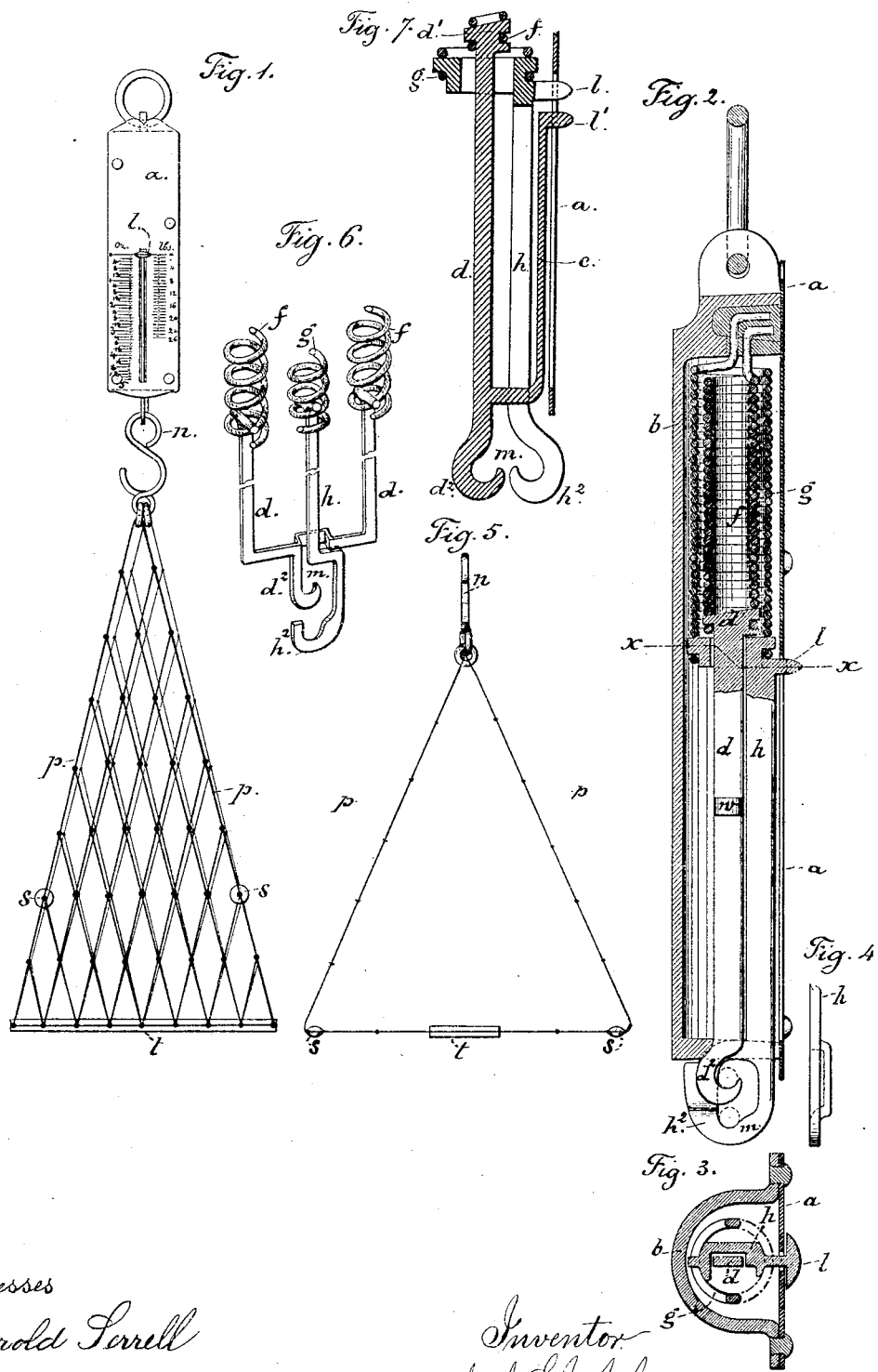

UNITED STATES PATENT OFFICE.

NICHOLAS A. L. J. JOHANNSEN, OF BROOKLYN, NEW YORK.

DUPLEX SPRING-BALANCE.

SPECIFICATION forming part of Letters Patent No. 269,941, dated January 2, 1883.

Application filed June 15, 1881. (Model.)

*To all whom it may concern:*

Be it known that I, NICHOLAS A. L. J. JOHANNSEN, a subject of the Emperor of Germany, and residing in the city of Brooklyn, Kings county, State of New York, have invented an Improvement in Balances, of which the following is a specification.

The object of my invention is to provide in one balance two distinct graduations, two weighing devices, and two points of connection of the article to be weighed, so that in case of articles that require to be weighed by ounces or smaller standards, a very delicate weighing device is used and heavy articles can be weighed in pounds or other large standards of weight by a more powerful weighing device. I make use of two places at which the pan or other containing device may be hooked upon the balance. In one place the resistance is a light spring to weigh small articles. In the other place two or more springs are made to support the article being weighed; and with one connection the balance will weigh by ounces up to five pounds, more or less, and with the other connection the same scale will indictate pounds and fractions from 0 to 26, more or less.

In the drawings, Figure 1 is an elevation of the balance and its scale. Fig. 2 is a vertical section, in larger size, through the springs and case. Fig. 3 is a sectional plan at the line $x\,x$. Fig. 4 is an edge view of the lower ends of the suspending-bars, and Fig. 5 shows the stretcher and netting at right angles to the position shown in Fig. 1. Fig. 6 shows the transferring device at the lower part of the balance as applied to a modified form of balance. Fig. 7 shows the transferring device as applied to another form of balance.

The case or shell $b$ of the balance is provided with a face, $a$, of brass or other suitable material. The helical spring $f$ is of a size to pass freely within the helical spring $g$, and the upper ends of these springs are passed through a flange or partition, and lead is cast into the space above this partition to surround the ends of the springs and firmly hold them in place, and the springs are concentric, or nearly so, in order that they may be extended or contracted without one spring rubbing against the other. These springs occupy the upper part of the case $b$, and in the lower part there are two vertically-sliding bars $d$ and $h$. The bar $d$ is connected with the spring $f$ and the bar $h$ with the spring $g$, these connections being made in any usual manner, such as passing one or two coils of each spring into grooves in the heads of the respective bars. The bar $d$ slides within the upper part of the bar $h$, and there is a head, $d'$, upon the bar $d$ above the upper end of the bar $h$, so that the bar $h$ can be pulled down and the spring $g$ distended without disturbing the bar $d$ or spring $f$; but when the bar $d$ is drawn down its head, acting upon the head of the bar $h$, causes both bars and both springs to move together. Therefore in one instance the balance has only one spring in action for light weights, and in the other instance both springs are brought into action for heavy weights. Attached to the head of the bar $h$ is the index or pointer $l$, projecting through a slot in the front plate, $a$; and there are two sets of graduations, the one on the left, Fig. 1, indicating ounces from 0 up to 5 pounds, the one on the right indicating half-pounds from 0 up to 26 pounds. The index is pointing both ways, so that one index will answer for the two sets of graduations.

The lower parts of the bars $d$ and $h$ are adapted to the reception of the hook or other device by which the article to be weighed is suspended. There is at the bottom of the bar $h$ an eye, $m$, or opening for the hook $n$, and at the lower end of the bar $d$ there is a hook, $d^2$. These parts are constructed so that the suspending-ring hook $n$ can either be connected with the bar $h$ only, resting at $h^2$, in weighing light articles, or said suspending-hook can be hooked upon the lower end of the bar $d$, and both bars $d$ and $h$ will then be moved together in weighing heavy articles. The suspending-hook $n$ is not removed from the suspending-eye $m$ in either case. There may be a stop on the bar $d$ to limit the downward movement, as at $w$.

In scales for household uses a scoop or pan is often objectionable on account of the space occupied by it. I provide a suspending-netting, $p$, with small rings or eyelets at the upper ends to pass over the hook $n$, and this netting increases in width as it descends, and it is connected with the edges of the narrow stretcher $t$, and there are small weights, as at $s$, upon the netting. These serve to keep the sides of the netting apart when placed in a position as shown in Fig. 5, the stretcher and weights resting upon a table, and the netting is to be opened or spread apart by hand, so that a plate or dish can be placed upon the stretcher, and the netting will draw up around such plate when the balance is lifted, and thereby hold the same from slipping out of the netting.

It is to be understood that the netting, when resting on the table, is to be spread apart by the hand, so as to be adapted to the reception of the plate or other article, and that the weights will hold the netting in that position.

The object of using a narrow stretcher, instead of a pan, is to allow of packing the whole together into a small space, the dimensions of the stretcher being not larger (or not materially larger) than those of the face-plate, so that when putting the balance away the stretcher can be laid on the face-plate, and the whole be put in a small box. If a pan of ordinary dimensions were used, a net would not be required, as chains or cords would do as well or better; but where the pan is thus reduced to the size of a narrow stretcher chains or cords will not work as well, for they are almost sure to entangle with the stretcher when the balance is put away, which difficulty is obviated by the netting.

If desired, the springs may be transposed, so that the inner spring will be used for light weights, the other parts being varied in shape to allow of this change; or the eye $m$ may be made of a different shape, as shown in Figs. 6 and 7; or the index, which in the drawings is represented with two points, may be replaced by two indexes—the one on the bar $h$, the other connected to the bar $d$—and the shape of the other parts may be varied to suit, so that the spring $f$ and its pointer would not be engaged when determining the heavy weights, (see Fig. 7;) or the hook or tongue $d^2$ may be varied in shape, or may be made movable itself, instead of the connecting hook or ring being hooked upon it. All these and similar changes are only differences in the details of my invention.

Instead of passing the hook $n$ through the eye $m$, a ring or other connecting part may be interposed between the hook and the eye, so that the change from one weighing device to the other would be effected by shifting the ring; or instead of suspending the hook $n$ from the eye $m$ it may be suspended from another eye below the eye $m$, the change from one scale to the other being effected by means of a separate connecting-piece, which may be placed either above or below the hook $d^2$, Fig. 2.

Fig. 6 shows the eye $m$ partially open, the open section being closed by the hook $d^2$, and the lower end of the bar $h$ terminating in a hook, $h^2$, which is situated vertically below the hook $d^2$ and closing up against it, so that the hook $d^2$, when going down, will strike against the hook $h^2$ and take it along, while if the hook $h^2$ only were pulled down the bar $h$ would slide by the hook $d^2$ without disturbing it. If preferred, the open eye may as well be used as that shown in Fig. 2.

If it should be desirable to determine the heavy weights by employing the spring $f$ only, instead of engaging the springs $f$ and $g$ both, the position of the hooks $d^2$ and $h^2$ may be changed, as shown in Fig. 7, the head of the bar $h$ being shaped so as to allow the passage not only of the bar $d$, but of the head $d'$ and spring $f$, and a pointer, $l'$, being connected with the lower part of the bar $d$ by means of the bar $c$, so that the spring $g$, when distended, would slide between the bars $d$ and $c$.

One of the advantages of the balance is the feature that the suspending device $n$ is made transferable from one weighing device to the other, which is preferable to the arrangement of two separate hooks, of which the one would have to pass the other in weighing. In the latter case the one hook may be impeded by or catch against the other, thereby preventing the free descent of the hook, which is necessary to obtain a correct indication of the weight. This difficulty is obviated by a transferable hook. It is to be understood that the suspension device $n$ is not necessarily confined to a hook with a netting attached to it, but means in a broad sense the receptacle or suspender which holds the article to be weighed, and may as well be a hook with a pan, or a hook without a pan, or a pan or net without a hook, fastened to the balance in a method similar to those indicated in Figs. 2, 6, and 7.

Another valuable point consists of the fact that the change from one scale to the other can be effected by a single movement, merely by changing the position of a movable connection. This is done by bringing the various springs within the range of motion of this movable connection by means of the bars suspended from the springs, these bars being arranged and shaped properly to that effect. It is to be understood that the movable connection by which the suspension device $n$ is transferred may as well be the suspension device $n$ itself as an additional part or body put in for the purpose. The method of securing the springs in the shell by means of a cast of lead overcomes a peculiar difficulty which otherwise would arise in the manufacture of balances with detachable springs. Springs, as a rule, are not perfectly regular, some being longer, some shorter. Therefore each balance needs adjustment in order that each spring may be adapted to a particular tension and fitted so that the point of the index coincides with the zero-point on the face-plate.

If two detachable springs are suspended from stationary suspension-points, their free ends have to be fitted not only so that each pointer coincides with its zero-point, but also to each other, so that both springs act simultaneously, if required, and the difficulty is that where they are adjusted to be correct for the zero-points they are likely to be wrong for simultaneous action, owing to the irregularity in the length of the springs. I overcome this difficulty by compensating for the irregularities in the length of the springs, not around the pointer, but at the point of suspension—i. e., in the recess on top of the shell—and there securing the parts by a head of lead cast in the recess. When the lower ends of the springs are correct, both for the zero-points and for simultaneous action, their upper ends may protrude into the recess more or less; but this makes no difference, because they will be firmly fixed in their position by the lead cast into the recess.

One of the essential points of my balance is the feature that the two sets of graduations, each forming a scale, are independent of each other, in distinction from other balances which have been made with divisions of the one scale bearing a certain proportion to those of the other. In a balance which shows pounds on one scale and the same weights in kilos on another scale the two sets of graduations are not independent of each other, for a change of division on the one scale necessitates a corresponding change on the other. Again, balances have been made with two dials so constructed that a given weight of, say, five pounds and seven ounces would show five pounds on the one dial and seven ounces on the other, both dials together being required to show a single weight, (in a similar way as the two hands on a clock show together only one time,) and the one dial being a mere subdivision of a unit on the other. In such a balance the divisions on the one dial are closely dependent upon those of the other, whereas in my balance the two scales have nothing to do with each other, and the one may even be changed so as to run up to only three pounds or two, instead of five, without in the least requiring a change in the other scale. This point, that the one set of graduations may be changed to suit without requiring a corresponding change in the other set, in connection with the point that only one scale can be used at a time to show the weight of an article, is essential to my balance, and constitutes the principle which makes the two scales independent of each other.

Balances have been made with two concentric springs, two dials, and two suspension-hooks; but they were not identical with mine, for, if so constructed that only one index showed the weight, there was no transferable suspension-hook, and if so constructed that the two dials together showed one weight there were no longer two separate weighing devices, and therefore no two scales independent of each other, to which class of balances my invention does not refer. My balance contains both a transferable suspension-hook and two scales independent of each other.

A further advantage of my balance over these old devices consists of the fact that instead of the circular arrangement of the graduations mine runs straight, allowing of a direct action of the distending spring upon the index, whereas a circular scale requires a transfer of motion from the spring to the index, which is more or less a cause of irregularity, and objectionable in a cheap household balance, in the manufacture of which the necessary care for adjustment cannot be given.

Another balance has been made somewhat similar in principle to mine, with three springs placed side by side, of which the middle one answered for one weighing device and the outside ones for another. This balance differs from mine in several important points. The bars suspended from the springs are there placed above the springs, the various springs are all of the same tension, and the change from one scale to the other requires at least two distinct operations.

The advantages of my improvements over this old device consist of the following points: By placing the springs one inside the other they require much less space than if placed side by side. By means of the concentric arrangement as few as two springs may be used to form two weighing devices, thus saving one of the three springs, and doing away with one of the sources of inaccuracy. The lateral arrangement of the springs requires not less than three of them.

I use springs of different tensions. By doing so, the second spring may balance weights five or ten times larger than those which the first spring will balance, while in scales having three springs that are alike a weight only three times the amount of the first given may be determined when using the three springs together.

In the old device referred to the springs have to bear the weight of the shell, which is not the case in mine.

In my balance the change from one connection to the other is performed by a single movement merely by putting the hook $n$ either above or below the hook $d^2$, while in the device before used the change from a single spring to a higher combination could not be made without moving at least two pins. This advantage is not merely the result of employing two springs instead of three, but is attained by a distinct new contrivance, as will be seen by reference to Fig. 6, which shows a balance with three springs, the suspending-eye $m$ and hook $d^2$ being in the same relation to each other as in Fig. 2.

I claim as my invention—

1. In a spring-balance, two sets of straight graduated scales independent of each other, two helical springs, one inside the other, and a suspension device connected with each spring, in combination with the suspension device $n$, which at will can be connected with one or the other of the springs or with one or both of the springs, substantially as specified.

2. In a spring-balance, two sets of straight graduated scales independent of each other, two springs of different tensions, and a suspension device connected with each spring, in combination with the suspension device n, which at will can be connected with one or the other of the springs or with one or both of the springs, substantially as specified.

3. In a spring-balance, two sets of straight graduated scales independent of each other, two separate weighing-springs, and suspended from one of the springs a bar connected with a pointer, said bar having at its lower end a suspending device to engage the hook n, in combination with a second suspending device situated between the springs and the article to be weighed, whereby the hook n may be connected with the other spring or with both, substantially as specified.

4. In a spring-balance containing two sets of straight graduated scales independent of each other, the combination of two weighing devices, one of them having but one spring, the other one or more springs, with one movable connection, which can be changed in position by a single movement, thereby transferring the suspension device n from the one weighing device to the other, substantially as specified.

5. In a spring-balance, a suspending-eye and one spring, in combination with a second spring and the suspending tongue or hook of the same, arranged to be within the eye that is connected with the other spring, so that the point of suspension of the suspending-hook n, may be transferred from one weighing device to the other without removing the suspending-hook from the said eye, substantially as specified.

6. In combination with the two separate springs in a balance, and their suspending devices, a double-pointed index and two sets of straight graduated scales, substantially as specified.

7. In a spring-balance containing two sets of straight graduated scales and two weighing devices, the means for retaining two springs in place, consisting of a head of metal cast around the ends of the springs and against a partition through which the wires of the springs pass, substantially as specified.

8. The combination, with a balance, of a netting and stretcher acting to extend the netting widthwise, substantially as set forth, for receiving the articles to be weighed.

Signed by me this 12th day of May, A D. 1881.

NICHOLAS A. L. J. JOHANNSEN.

Witnesses:
HAROLD SERRELL,
WILLIAM G. MOTT.